United States Patent [19]
Rotman et al.

[11] Patent Number: 5,992,794
[45] Date of Patent: Nov. 30, 1999

[54] EXTERNAL AIRBAG PROTECTION SYSTEM FOR HELICOPTERS

[75] Inventors: Israel Rotman, Nofit; Gideon Rosenberg, Tivon, both of Israel

[73] Assignee: State of Israel-Ministry of Defense, Armament Development Authority Rafael, Haifa, Israel

[21] Appl. No.: 09/009,409

[22] Filed: Jan. 20, 1998

[30] Foreign Application Priority Data

Mar. 20, 1997 [IL] Israel ........................................ 120698

[51] Int. Cl.⁶ .................................................. B64D 25/00
[52] U.S. Cl. .................................. 244/17.17; 244/138 R; 244/139
[58] Field of Search ........................... 244/17.17, 100 S, 244/138 R, 139, 121

[56] References Cited

U.S. PATENT DOCUMENTS 5,259,574  11/1993  Carrot ........................................ 244/139
5,560,568  10/1996  Schmittle ................................. 244/139
5,765,778   6/1998  Otsuka ...................................... 244/139

FOREIGN PATENT DOCUMENTS 535577    1/1957   Canada .............................. 244/138 R
1341861   9/1963   France .............................. 244/138 R
1431268   3/1969   Germany .......................... 244/138 R
3024551   1/1982   Germany .......................... 244/138 R
4118300  12/1992   Germany .......................... 244/138 R

*Primary Examiner*—Galen L. Barefoot
*Attorney, Agent, or Firm*—Mark M. Friedman

[57] ABSTRACT

An airbag protection system for helicopters. Airbags are inflated either automatically or manually, or a combination of both, prior to the helicopter striking the ground, thus avoiding or ameliorating a crash. Proximity sensors detect a fast descent to trigger inflation of the airbags located beneath the helicopter fuselage so that they can cushion the impact with the ground. Venting of the gas from the airbags is also provided to release the gas from the airbags so as to prevent rebound of the helicopter from the ground.

12 Claims, 3 Drawing Sheets

EXTERNAL AIRBAG PROTECTION SYSTEM FOR HELICOPTERS

The present invention relates to an airbag protection system. More particularly, it relates to an external airbag protection system for helicopters.

BACKGROUND OF THE INVENTION

Airbag safety systems are well known and widely used in the automotive industry. The basic idea behind inflatable airbags installed in motor vehicles is to serve as a cushioning means for the passenger's head and torso which is thrust forward in the event of a head-on collision. When a head-on collision occurs, collision sensors such as metal distortion sensors activate the airbag inflation device, and the airbag is instantly inflated. Momentum of forward travel causes the head and chest of the passengers sitting in front of the inflated airbag to thrust forward and hit the inflated airbag, which is equipped with air vents. Upon impact of the head and chest with the airbag, air is released from the airbag through the vents thus reducing dramatically the severity of the impact, avoiding head injury inflicted by the windshield, and diminishing whiplash effects.

Recent studies have been carried out on the feasability of implementing airbag safety systems in aircraft. The development of airbag technology for aircraft, including overviews of military helicopter cockpit and commercial transport aircraft and airbag development programs, were discussed in the International Conference on Cabin Safety Research, held in Atlantic City, N.J., on Nov. 14–16, 1995. Projected effectiveness of airbag supplemental restraint systems in U.S. Army helicopter cockpits was discussed in the American Helicopter Society (AHS) annual forum in Washington, DC, on May 11–13, 1994, in Alexandria, Va. This study reviewed army helicopter accident records over a nine year period and developed a computer model to determine the number of fatal and disabling injuries to cockpit crew members that could be prevented with an airbag supplemental restraint system installed inside the cockpit.

In Israeli Patent Application No. 120,334, a multi directional airbag protection device for crews in military combat vehicles was disclosed. That device was designed to provide a restraining means for crew members when the vehicle is subjected to an explosion or a direct hit, in an attempt to prevent, or at least reduce, the number of casualties resulting from the explosion or hit. Upon the deployment of the airbag of that invention, the passenger is instantaneously restrained and tightened to his seat by the airbag.

When an aircraft, and in particular when a helicopter is considered, the severity of an accidental event is much greater than the event of a typical automotive traffic accident, as it involves a vertical drop which increases immensely the energy release upon the impact on the ground, and is therefore generally lethal for the aircraft crew members.

When engine failure occurs in an airplane, aerodynamic structure can provide for a safe landing as the airplane is capable of gliding fairly safely and perform an emergency landing. A helicopter, on the other hand, depends solely on the lift power provided by the rotor blades. This means that if the rotor blades are removed or damaged, the helicopter fuselage is bound to fall freely, subjected to the gravitational force only, and consequently hit the ground at a high energy impact, resulting in the loss of life of most, if not all, of the crew members.

However, if the helicopter engine fails, and yet the rotor blades remain intact, the pilot can still attempt to maneuver the aircraft to a safe landing, with the help of the auto rotation effect. Auto rotation is attributed to the design of the rotor blades, making it possible to keep the rotor blades rotating even when the engine stops functioning. When auto rotation takes place, the aircraft vertical velocity is greatly reduced, bringing the aircraft velocity upon hitting the ground to the order of about 10 meters per second. As a result, auto rotation provides lift power to the aircraft, enough to enable the power to the aircraft and permit the pilot to land the helicopter relatively safely. Helicopter pilots who practice emergency situations are taught to take advantage of the auto rotation effect.

There are different types of helicopters, ranging from very light civilian choppers, up to heavy cargo and troop carrier helicopters, like Sikorsky CH-53. Some helicopters, mainly military ones, have been especially designed to acquire crash resistant structure, like the Apache or the Blackhawk. Yet most helicopter crashes result in very high fatality statistics despite safety equipment.

Investigations of a military helicopter collision accident involving two helicopters in 1997 concluded that one of the helicopters was seen experiencing some yawing, trying to maneuver into landing, before finally hitting the ground and crashing. In Japanese Patent Application No. 7-6328 of Ohtuka Ayako a safety system for helicopters was disclosed. According to this invention, the helicopter is equipped with shafted spare engines, capable of exchanging propellant force in a vertical or a horizontal direction, and inflatable airbags are placed under the body, which can quickly be inflated in case of an emergency forced landing in order to relieve the landing shock. This invention, however, requires the presence of an additional spare engine on the helicopter, which means putting an additional weight on the helicopter and requiring design adjustments, and also relying on the spare engines to operate together with the airbag device. Another problem in Ayako's invention is the possible rebound off the ground the helicopter is likely to experience if the airbag remains fully inflated and does not burst or deflate upon hitting the ground. On the other hand, if the airbag bursts upon impact, it's cushioning properties may be lost, subjecting the helicopter to more energetic impact than configured. It should be emphasized that Ayako's invention provides an airbag protection system designed to be operated by the helicopter's pilot while still in control of the aircraft when there is still some time for the pilot to perform the operations required for the system to work properly, i.e., to engage the spare engines, activate the inflation of the airbags, and adjust the airbag positions underneath the aircraft, before performing an emergency forced landing. The pilot in Ayako's invention uses the spare engines as a temporary replacement for the rotor blades, and the airbag acts merely as an additional means of protection. However, the system described by Ayako will not provide the desired protection in the event of the aircraft dropping unexpectedly and hitting the ground before the pilot could perform all the above actions.

It was found that the human chest can withstand accelerations in the magnitude of up to 40 g and the head can withstand alterations of up to 60 g. However, the spinal column is more vulnerable. In helicopter crashes, it was suggested that in order to mitigate about 80% of injuries in survivable crashes, the peak spinal accelerations should preferably not exceed the order of 10 g. In order to protect crew members of a crashed helicopter, it should be designed not to exceed said accelerations in the form of a safety system installed which would cushion and soften the helicopter crash on the ground, and in particular protect the fuel tanks, as it is vulnerable to explode and burn upon impact with the ground.

It is therefore an object of the present invention to provide an airbag protection system for helicopters, to improve the crash resistance of helicopters.

It is another object of the present invention to provide such a system that would provide helicopters protection in an event of an unexpected drop.

It is yet another object of the present invention to provide an airbag protection system for helicopters that would prevent possible rebound on impact and yet preserve its cushioning properties.

SUMMARY OF THE INVENTION

Accordingly, the present invention provides for an airbag safety system for a helicopter comprising:

at least one inflatable airbag externally attached to the bottom of the helicopter's fuselage initially being in its deflated state; means for the inflating the airbag with gas up to a predetermined pressure value;

means for actuating of the inflating means; and means for releasing the gas from within the inflated airbag upon impact with the ground.

These and other objects of the invention will become apparent from the description of the attached specification, wherein:

PREFERRED EMBODIMENT OF THE INVENTION

Figure 1:
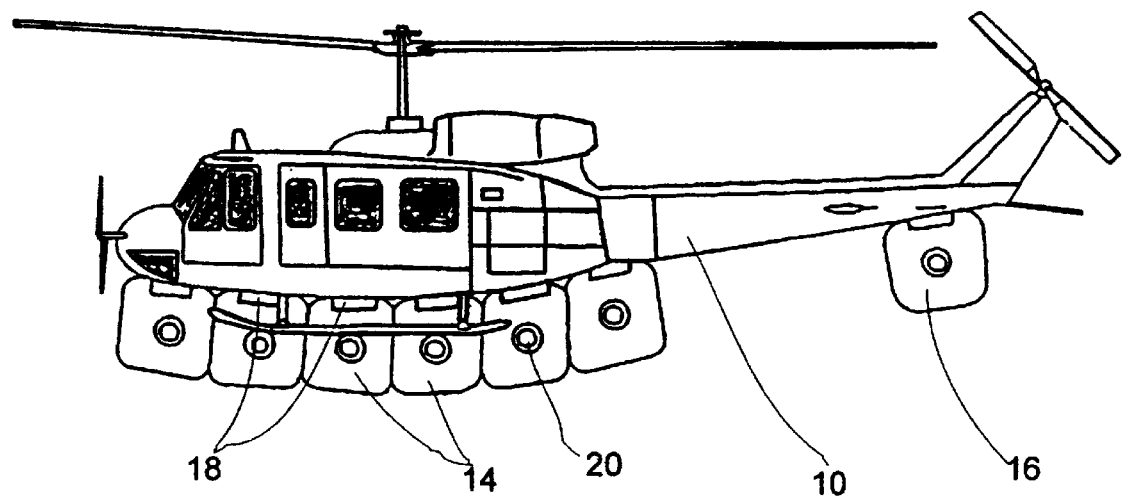
FIG. 1 illustrates a side view of a helicopter equipped with a contemplated embodiment of the airbag safety system of the present application showing the airbags fully inflated.
Figure 2:
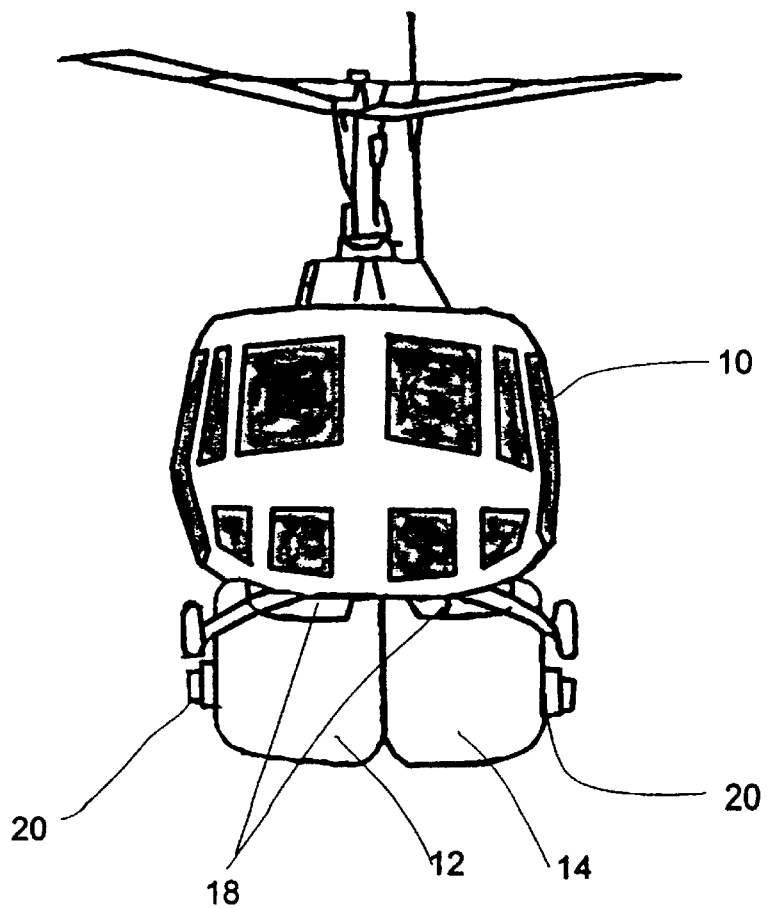
FIG. 2 illustrates a frontal view of a helicopter equipped with the same embodiment of the airbag safety system of the present invention.

Referring now to FIGS. 1 and 2 there is illustrated a side and frontal view of a helicopter equipped with the airbag safety system for a helicopter 10 of the present invention, showing airbags fully inflated. Two rows of airbags 12 and 14 are positioned beneath the fuselage of the helicopter, attached to its bottom. While the example illustrated herein shows airbags arranged in rows, it should be understood that any arrangement providing substantial covering of the bottom of the helicopter will be equally appropriate. Only row 14 is shown in FIG. 1, row 12 hidden from view in the particular viewing angle. An additional airbag 16 is positioned beneath the tail of the helicopter.

Each airbag is initially stored, in its deflated state, inside a breakable container 18, which gives way upon the inflation of the airbags 12, 14 and 16 allowing the airbags to expand to their fully inflated state. In its fully inflated state, the vertical diameter of each airbag is at least one-quarter meter in length. Preferably, the helicopter fuselage bottom is substantially covered by the airbag system, when the airbags are in their fully inflated state.

When the helicopter experiences a sudden drop, the actuating means of the airbag safety system for a helicopter of the present invention activates the inflating means which then inflate the airbags 12, 14 and 16 to their fully inflated state to a predetermined pressure value. The airbag inflation gas can preferably be selected from azides, like sodium azide, or compressed gases. The airbag itself can be made of a fabric, or similar material, provided it can withstand internal pressure buildup exerted upon hitting the ground without bursting or tearing. A vent 20 is located on the wall of each airbag 12, 14 and 16, whose opening is capable of releasing the pressurized inflation gas from within said airbag at a predetermined rate, which is slow enough to enable the airbag to cushion and soften the impact on the helicopter impact on the ground, and yet fast enough to avoid internal pressure buildup that will exceed its holding capacity and cause its bursting or tearing, thus losing its cushioning and softening properties. In order to ensure that the airbag provides the intended cushioning effect upon contact with the ground, the vents 20 are retained in their closed position until they are opened when the airbag contacts the ground and increases the pressure within the airbag. For this purpose, each vent 20 is provided with a blocking member (not shown) that breaks away when the pressure inside the bag exceeds a predetermined value as a result of impact with the ground so that the gas contained inside the airbag can be released. Airbag manufactures quote up to 3 atmospheres as the maximal pressure normal airbag production material can withstand prior to bursting, and this is taken into account when designing the appropriate vent size and the blocking member's predetermined breaking pressure value.

Figure 5:
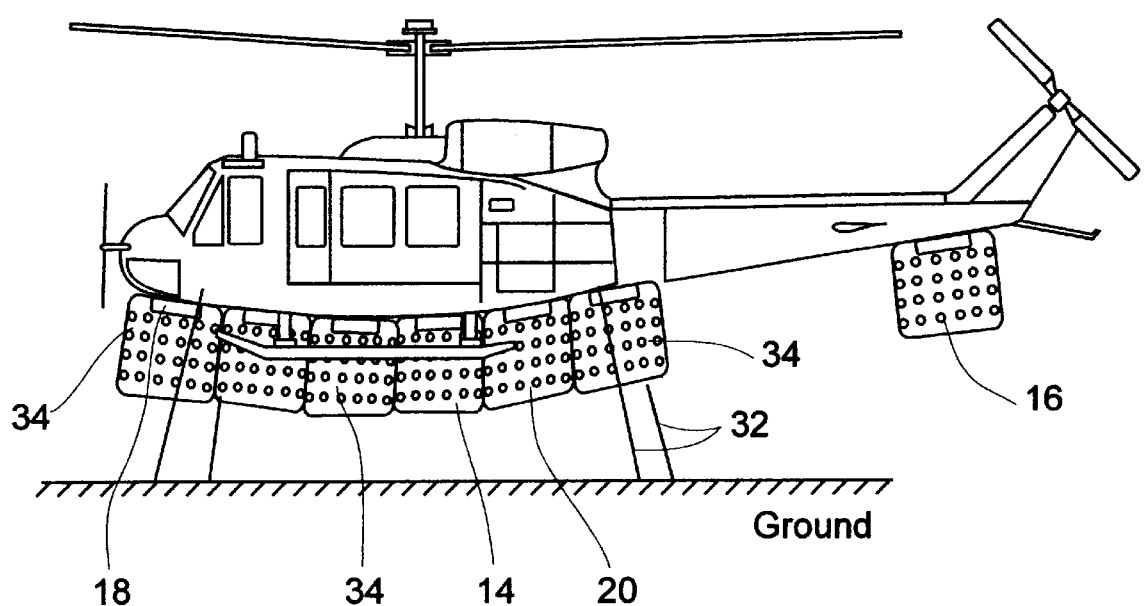
FIG. 5 illustrates a side view of a helicopter equipped with an alternative embodiment of the airbag safety system, the airbags including porous walls.

Alternatively, as illustrated in FIG. 5, rather than employing sealed airbags with blockable venting members, the airbags can be porous, the dimensions of the pores 36 of each airbag being equal to the dimensions of the vent created when the blocking member breaks away from the vent 20.

Figure 3:
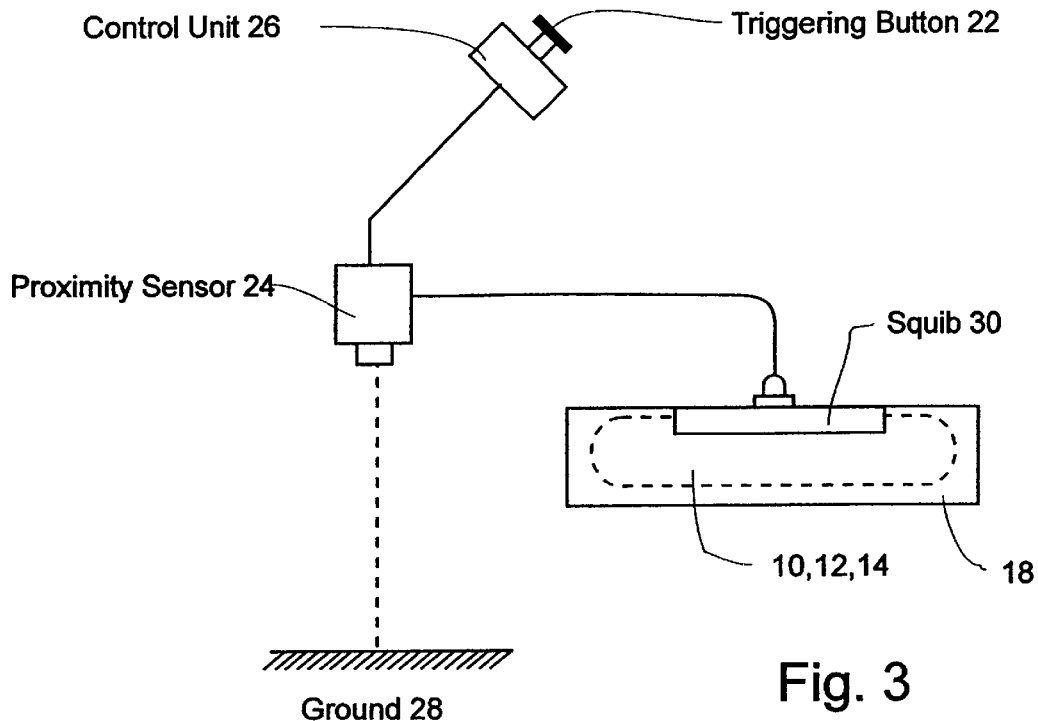
FIG. 3 is a schematic diagram of a actuating system for the airbag protection system of the present invention.

The actuating means optionally can also be a manually operated device. A combination of both is also possible. FIG. 3 is a schematic illustration of an actuating device for the airbag protection system of the present invention using a combination of both an automated and manual actuating device. It incorporates the use of a manual trigger and an automatic trigger, whereby only after both triggers have been actuated is the inflating means activated. The actuating means comprises a manual triggering button 22, a control unit 26, and a conventional proximity sensor 24. When the helicopter pilot encounters a dangerous situation, such as a sudden drop, engine failure or others, he or she depresses manual triggering button 22. This alone does not actuate the inflating means yet. The control unit 26 still requires a second triggering signal from the proximity sensor 24, which is capable of detecting the helicopter's vertical velocity and height above the ground 28. When the helicopter 10 reaches a predetermined vertical velocity and approaches the ground 28 at a predetermined height, the proximity sensor 24 detects the ground and a second triggering signal is produced, which causes control unit 26 to generate an actuating signal to squib 30 to inflate the airbags 12, 14 and 16.

Figure 4:
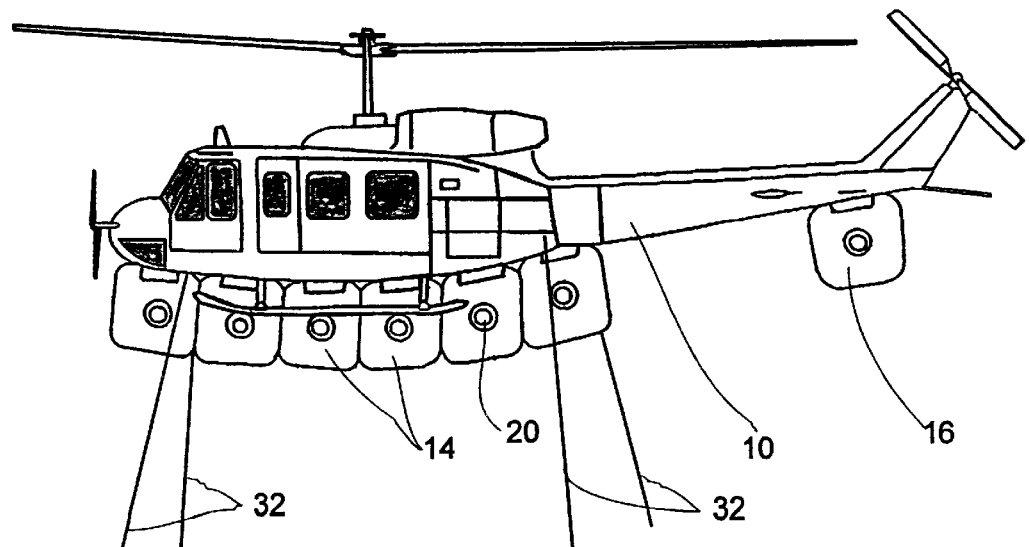
FIG. 4 is a side view of a helicopter showing extendable sensors deployed from the helicopter prior to deployment of the airbags.

In an alternative embodiment shown in FIG. 4, depression of the triggering button 22 by the pilot causes sensors 32, typically four in number, to be deployed from the fuselage in an expanded position. Typically, the sensors can be stored in a folded or telescoping position within the helicopter prior to their being deployed. When deployed, they would be extended approximately two meters downwardly from the fuselage. Contact with the ground with any one of the sensors would cause squib 30 to explode and inflate the airbags 12, 14 and 16. Since the airbags can be deployed in approximately 100 milliseconds, the two meter extensions of the sensors is sufficient to cause full deployment of the airbags prior to impact of the helicopter 10 with the ground.

The actuating means can also be solely manually operated by the pilot or other crew member, acting upon his own decision, when according to his own judgement, the helicopter 10 is dropping and about to hit the ground 28.

In the case of the actuating means being automatic (or with a dual triggering device as described hereabove), the airbag inflating means can be predesigned to be activated just before hitting the ground, at a predetermined height above the ground, using the proximity sensor to determine the helicopter's height above the ground, and its vertical velocity. This means that the system would be activated just before hitting the ground, and therefore the inflation gas contained within the inflated airbag will not be able to substantially cool off and lose its pressure through the vent, prior to the impact on the ground.

It should be pointed that installing the airbag safety system for a helicopter according to the present invention on a helicopter does not guarantee 100% survival rate of the crew members and passengers in any event of a vertical crash, but it can reduce fatalities and severe casualties in certain crashes that would otherwise inevitably occur.

It should be clear that the above description of the embodiments of the present invention and the Figures disclosed are given for illustrative purposes only and in no way limit the scope of the invention as defined in the appended claims.

What is claimed is:

1. An airbag safety system for a helicopter comprising:
   at least three inflatable airbags having porous walls externally attached to the bottom of the helicopter's fuselage initially being in its deflated stage;
   means for inflating said porous airbags quickly with gas up to a predetermined pressure value when said helicopter is within close proximity to the ground;
   means for actuating said inflating means;
   wherein the gas from within said inflated airbags is quickly released through said porous walls upon impact with the ground.

2. The system according to claim 1 wherein said airbags comprises plural rows of three or more porous airbags attached to the helicopter's fuselage bottom to thoroughly cover the bottom of said helicopter fuselage when said airbags are in their fully inflated stage.

3. The system according to claim 1, wherein said actuating device incorporates the use of a manual trigger and an automated proximity sensor trigger, whereby only after both said manual and said automated triggers have been actuated is said inflating means activated.

4. The system according to claim 3, further including breakable storage containers for storing said deflated airbags, said containers breaking upon inflation of said airbags.

5. The system according to claim 3, further including an additional airbag located beneath the tail of the helicopter.

6. The system according to claim 3, wherein said proximity sensor detects the helicopter's vertical velocity and height above the ground to activate said actuating means at predetermined heights and velocity.

7. The system according to claim 3, wherein said actuating means comprises a manually operated trigger.

8. The system according to claim 3, wherein said airbag inflating means is inflated by a gas selected from azid gases, or compressed gases.

9. The system according to claim 3 wherein said predetermined pressure release rate from porous airbags is slow enough to enable the airbags to cushion and soften the helicopter impact on the ground yet fast enough to avoid internal pressure buildup that will exceed its holding capacity and cause its bursting or tearing.

10. The system according to claim 9, wherein said predetermined internal pressure value does not exceed 3 atmospheres.

11. The system according to claim 3 wherein said proximity sensor comprises extendable sensors normally stored within said helicopter and deployable approximately two meets downwardly into an extendable position, so that said sensors contact the ground to cause said actuating means to inflate said airbags.

12. The system as recited in claim 3 wherein said inflated airbags are at least 0.25 meters in vertical diameter length.

\* \* \* \* \*

UNITED STATES PATENT AND TRADEMARK OFFICE
CERTIFICATE OF CORRECTION

PATENT NO. : 5,992,794
DATED : November 30, 1999
INVENTOR(S) : Rotman et al

It is certified that error appears in the above-identified patent and that said Letters Patent is hereby corrected as shown below:

On the title page, insert item [30], Foreign Application Priority Data
Mar. 20, 1997 [IL] Israel....................................120498

Signed and Sealed this

Twenty-second Day of August, 2000

Attest:

Q. TODD DICKINSON

*Attesting Officer*    *Director of Patents and Trademarks*